United States Patent Office  3,551,009
Patented Dec. 29, 1970

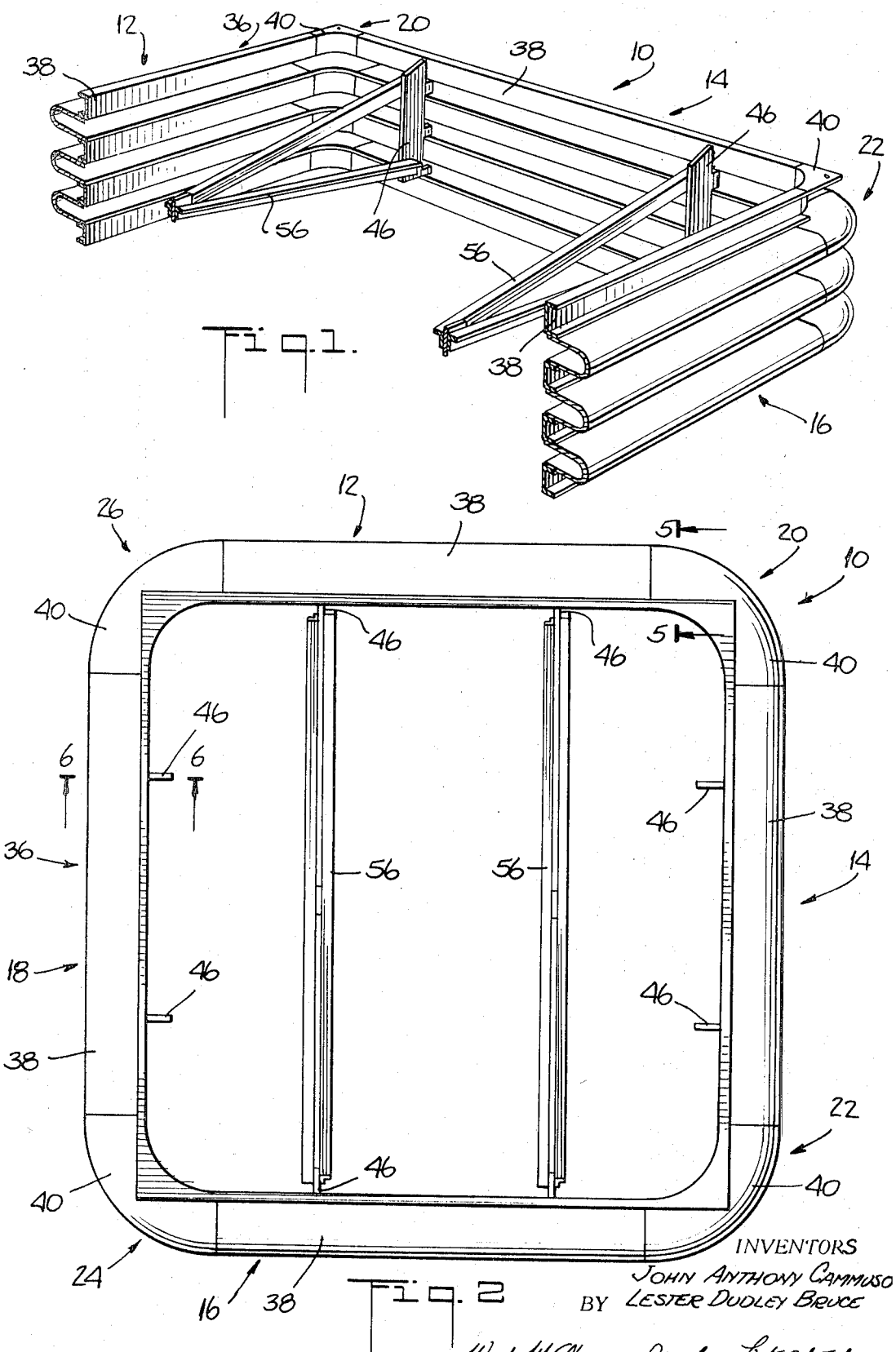

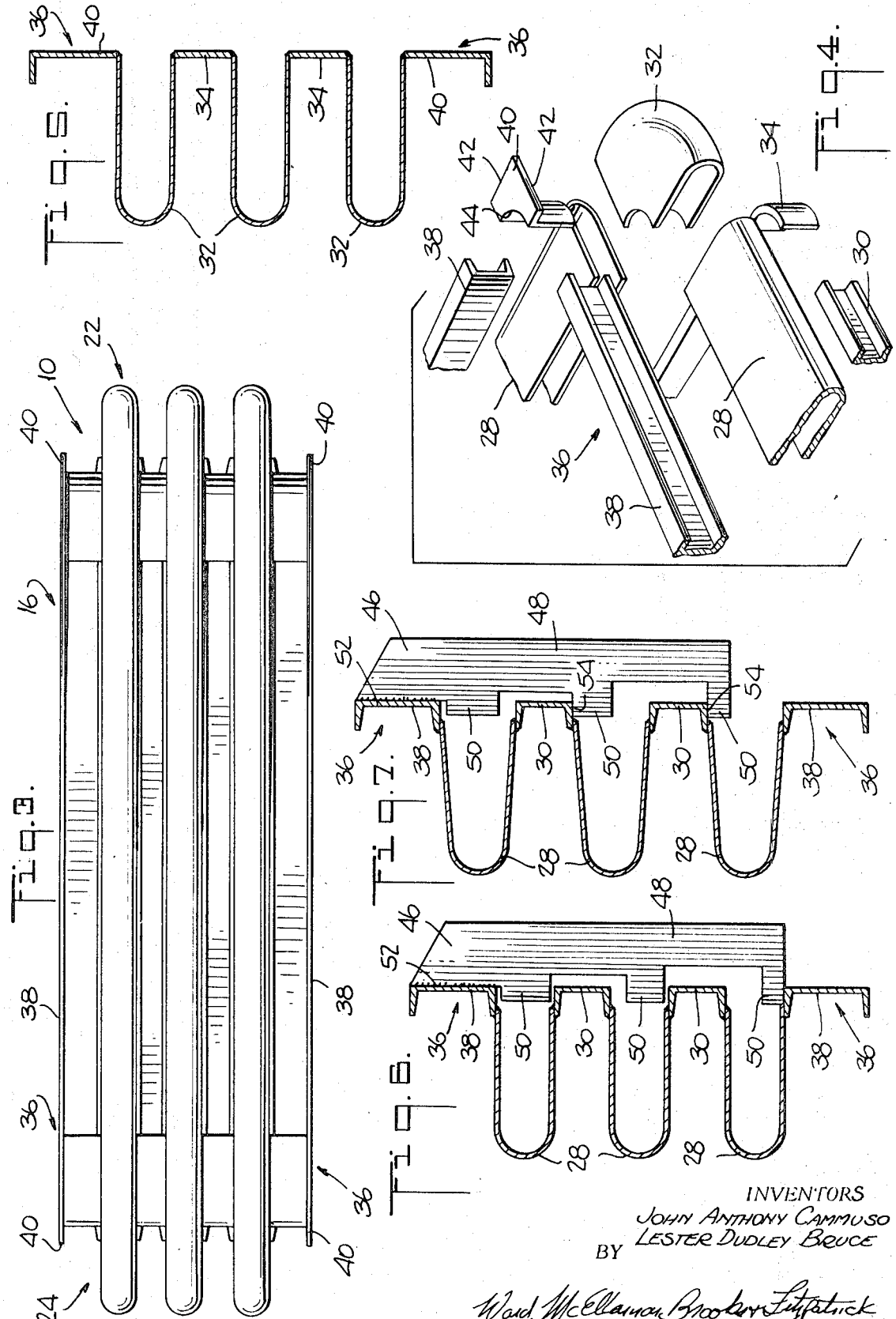

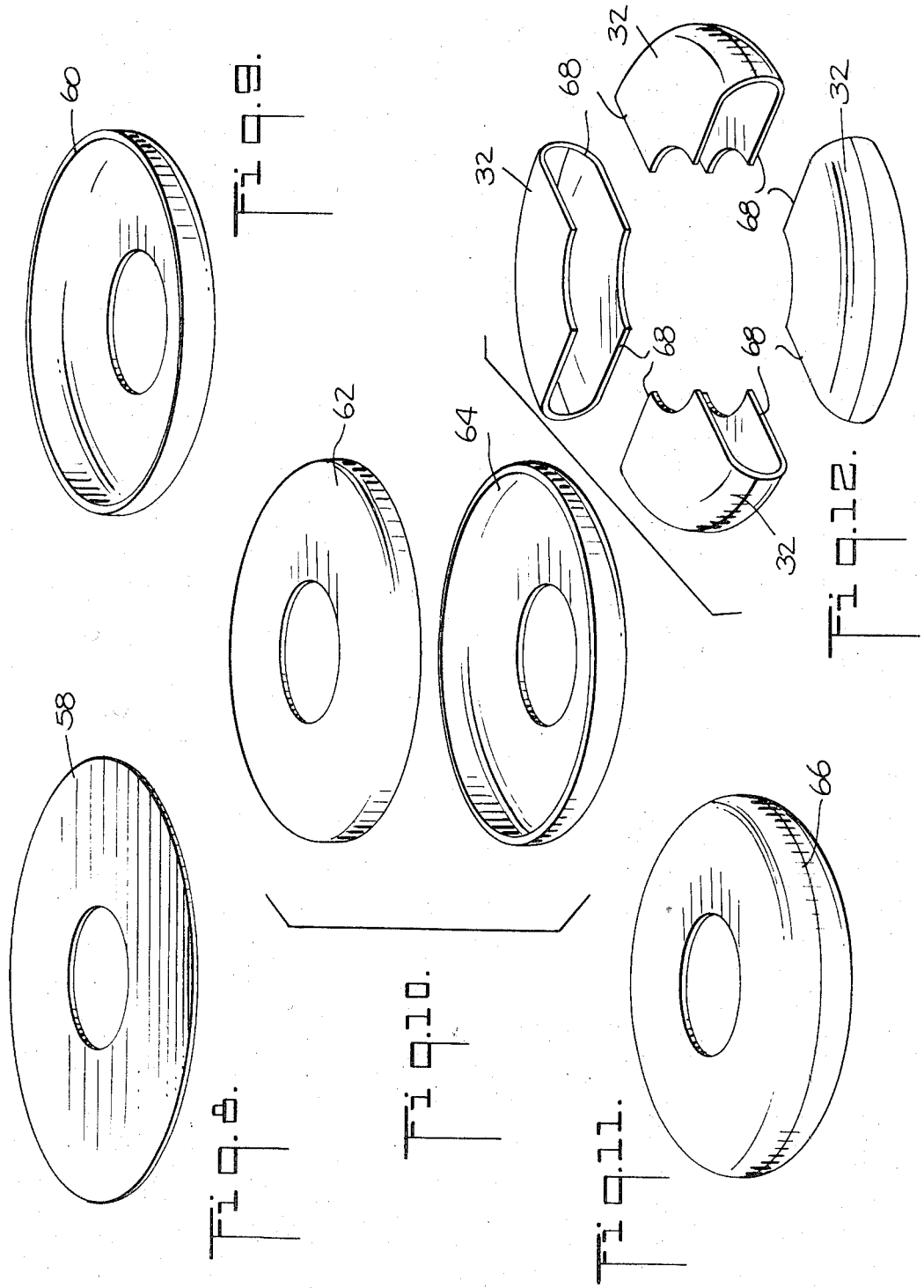

3,551,009
EXPANSION JOINT ASSEMBLY
John Anthony Cammuso and Lester Dudley Bruce,
Worcester, Mass., assignors to Riley Stoker Corporation, Worcester, Mass., a corporation of Massachusetts
Filed Dec. 23, 1968, Ser. No. 786,256
Int. Cl. F16l 51/02
U.S. Cl. 285—226                 7 Claims

ABSTRACT OF THE DISCLOSURE

This invention relates to an expansion joint assembly and method of forming same wherein a plurality of angularly disposed corrugated walls are connected to each other by a like plurality of corrugated corner walls, respectively. Each of the corrugated walls includes a plurality of U-shaped members interconnected by a plurality of C-shaped channels, and each of the corrugated corner walls includes a plurality of U-shaped rounded corner members interconnected by rounded corner flats.

---

This invention relates to pipe or conduit connections and more particularly to expansion joint assemblies of the type adapted, among other possible applications, for use between duct or breeching sections.

While many different types of expansion joints have been successfully used heretofore, our contribution to the art is a new and improved expansion joint which is an improvement over such prior expansion joints, as will become apparent as the description proceeds.

Problems were encountered with prior art structures because they were not able to adequately withstand lateral movement in conjunction with axial compression, and because they were difficult and expensive to fabricate as well as being difficult to repair. In addition, prior art constructions were somewhat inefficient and required a large number of folds to provide sufficient flexibility. Moreover, the expansion was uneven over a plurality of folds or corrugations causing undue wear at certain critical points. The joints were inherently weak in the corners. It is an object of this invention to overcome these prior art difficulties, or to reduce same to insignificance.

Briefly, our invention contemplates the provision of a new and improved expansion joint assembly including a plurality of corrugated walls disposed to extend in angular relationship with respect to each other, and the end portions thereof being connected to each other by corrugated corner walls, respectively. Each of the corrugated walls, including a plurality of elongated U-shaped members, is interconnected by a like plurality of members such as elongated C-shaped channels, for example. Each of the corner walls includes a plurality of U-shaped rounded corner members interconnected by a like plurality of rounded corner plates, respectively.

In one form of our invention, each of the corner members is fabricated from a pair of oppositely disposed segments of dished doughnut shaped plates welded together. In another form of our invention, a guide flat is provided to divide the expansion between the corrugations in accordance with a preselected pattern. Preferably, the guide flat equalizes the expansion between the corrugations, thereby equalizing the stresses.

It is a feature of novelty of the present invention to provide a method of fabricating an expansion joint assembly including the steps of forming a plurality of corrugated walls by welding a plurality of C-shaped channels between a like plurality of U-shaped members. The next step is forming a plurality of corrugated corner walls by welding a plurality of rounded corner plates between a like plurality of U-shaped rounded corner members at their extremities respectively, and then interconnecting the ends of the corrugated walls to each other by welding the corrugated corner walls therebetween. A part of our contribution resides in forming a corrugated corner by taking a plurality of pairs of doughnut shaped plates, dishing the plates, arranging each pair in oppositely disposed relation one with respect to the other and welding the periphery of one plate to the periphery of the other plate, and then cutting each of the pairs into a plurality of U-shaped rounded corner members.

There has thus been outlined rather broadly the more important features of the invention in order that the detailed description thereof that follows may be better understood, and in order that the present contribution to the art may be better appreciated. There are, of course, additional featues of the invention that will be described hereinafter which will form the subject of the claims appended hereto. Those skilled in the art will appreciate that the conception on which this disclosure is based may readily be utilized as the basis for the designing of other structures for carrying out the several purposes of the invention. It is important, therefore, that this disclosure be regarded as including such equivalent constructions as do not depart from the spirit and scope of the invention.

One embodiment of the invention has been chosen for purposes of illustration and description, and is shown in the accompanying drawings, forming a part of the specification wherein:

FIG. 1 is a perspective view of a portion of an expansion joint assembly constructed according to the concept of this invention;

FIG. 2 is a plan view of the expansion joint assembly;

FIG. 3 is a side elevation of the expansion joint assembly;

FIG. 4 is an enlarged fragmentary exploded view showing details of the corner construction of the expansion joint;

FIG. 5 is an enlarged sectional view taken along the line indicated at 5—5 in FIG. 2, and showing details of the corner construction;

FIG. 6 is an enlarged sectional view taken along the line indicated at 6—6 in FIG. 2, and showing details of the side walls when the expansion joint is in its contacted condition;

FIG. 7 is an enlarged sectional view similar to FIG. 6, but showing details of the side walls when the expansion joint is in its expanded condition;

FIG. 8 is an enlarged perspective view of a doughnut shaped plate used in forming a corner member;

FIG. 9 is an enlarged perspective view of a doughnut shaped plate of FIG. 8, but showing the plate subsequent to the dishing operation;

FIG. 10 is an enlarged perspective exploded view of two oppositely disposed dished doughnut shaped plates;

FIG. 11 is an enlarged perspective view of the two oppositely disposed dished doughnut shaped plates subsequent to being welded one to the other around their periphery;

FIG. 12 is an enlarged perspective exploded view of the two oppositely disposed dished doughnut shaped plates after being cut into segments.

Referring to the drawings in greater detail, as shown in FIGS. 1 and 2, an expansion joint assembly indicated generally at 10 includes a plurality of corrugated walls indicated generally at 12, 14, 16 and 18 (FIG. 2) disposed to extend in substantially 90° angular relationship with respect to each other, the end portions of the corrugated walls being connected to each other by corrugated corner walls indicated generally at 20, 22, 24 and 26.

As best seen in FIGS. 4, 6 and 7, each of the corrugated walls includes a plurality of elongated U-shaped members 28, and a like plurality of elongated C-shaped channels 30 interconnecting the U-shaped members at their extremities, respectively. The U-shaped members 28 and the C-shaped channels 30 are fabricated from any suitable metal, and preferably the U-shaped members are fabricated from metal substantially more resilient than the C-shaped channels.

Referring in particular to FIGS. 4 and 5, each of the corrugated corner walls includes a plurality of U-shaped rounded corner members 32, and a like plurality of rounded corner flats 34 interconnecting the U-shaped rounded corner members 32 at their extremities, respectively. The U-shaped rounded corner members 32 and the rounded corner flats 34 are fabricated from any suitable metal, and preferably the U-shaped rounded corner member have substantially more resiliency than the rounded corner flats.

As best seen in FIGS. 1–3, the expansion joint assembly 10 further comprises an end flange indicated generally at 36 mounted on each end of the joint assembly. Each of the flanges includes elongated C-shaped channels 38 (FIG. 4, 6 and 7) connected to the elongated U-shaped members 38 of the corrugated walls 12, 14, 16 and 18. In addition, each of the flanges includes L-shaped corner flanges 40 (FIGS. 4 and 5) connected to the U-shaped rounded corner members 32 of the corrugated corner walls 20, 22, 24 and 26. As seen in FIG. 4, these L-shaped corner flanges have two outside straight edges 42 and a rounded inner edge 44. The end flanges serve to interconnect the expansion joint assembly between ducts or breeching sections, in the usual manner.

As seen in FIGS. 1, 2, 6 and 7, the expansion joint assembly further comprises two guide flats 46 for each of the corrugated walls 12, 14, 16 and 18. The guide flats are characterized by an elongated partition 48, FIGS. 6 and 7, having a plurality of spaced inwardly directed projections 50, extending into the corrugations respectively to control the expansion of one corrugation with respect to the next adjacent corrugation. That is, the elongated portion 48 is connected to the U-shaped members 38, as at 52, and the projections 50 are spaced therealong so that one fits into each U-shaped member 28 when the expansion joint assembly is in its contracted condition, as seen in FIG. 6, and each projection 50 engages one edge, as at 54, of each of the C-shaped channels 30 when the expansion joint assembly is in its expanded condition, as seen in FIG. 7. It will be particularly appreciated that each corrugation is adapted to expand substantially a preselected equal amount so that they will each be subjected to substantially the same stresses and strains. As seen in FIGS. 1 and 2, elongated guide flat bracing elements 56 extend from one guide flat 46 disposed adjacent one wall to a second guide flat 46 disposed adjacent an opposite wall. These serve to strengthen and retain the guide flats in position.

As best seen in FIGS. 8–12, each of the U-shaped rounded corner members 32 is fabricated by a new and improved method. These corner members are formed by taking a doughnut shaped plate 58, FIG. 8, and dishing said plate to form a concave dished plate 60, FIG. 9. The plates are then arranged in oppositely disposed relationship one with respect to the other, as at 62 and 64, FIG. 10, before welding the periphery of one plate to the periphery of the other plate as at 66, FIG. 11. Finally, the composite is cut into four U-shaped rounded corner members 32, as by cutting along lines 68, FIG. 12. These members are then ready for fabrication in the expansion joint assembly.

It will thus be seen that the present invention does indeed provide an improved expansion joint assembly which is superior in simplicity, economy and efficiency as compared to prior art such devices. In addition, it will be appreciated that applicant has contributed to the art a new and improved method of fabricating an expansion joint assembly which is superior to methods employed heretofore.

Although one embodiment of the invention is herein disclosed for purposes of explanation, various modifications thereof, after study of this specification, will be apparent to those skilled in the art to which the invention pertains.

What is claimed and desired to be secured by Letters Patent is:

1. An expansion joint assembly of the class described, the combination comprising a plurality of corrugated walls extending in angular relationship with respect to each other, the end portions of the corrugated walls being connected to each other by corrugated corner walls respectively, each of said corrugated walls including a plurality of elongated U-shaped members, a like plurality of elongated C-shaped channels interconnecting the U-shaped members at their extremities respectively, each of said corrugated corner walls including a plurality of U-shaped rounded corner members, a like plurality of rounded corner flats interconnecting the U-shaped rounded corner members at their extremities respectively, a guide flat for each of said corrugated walls including an elongated portion having a plurality of spaced inwardly directed projections extending into said corrugations respectively to control the expansion of one corrugation with respect to the next adjacent corrugation, and elongated guide flat bracing elements extending from one guide flat disposed adjacent one wall to a second guide flat disposed adjacent an oppositely disposed wall.

2. An expansion joint assembly according to claim 1 wherein said corner member is fabricated from a pair of oppositely disposed dished doughnut shaped plates welded together and cut into segments.

3. An expansion joint assembly according to claim 1 further comprising an end flange mounted on each end of the expansion joint, each of said end flanges including elongated C-shaped channels mounted on said corrugated walls and L-shaped corner flanges having two outside straight edges and a rounded inner edge mounted on said corrugated corner walls.

4. An expansion joint assembly according to claim 1 wherein said inwardly extending projections are spaced to provide equalized expansion of said corrugations one with respect to the others.

5. An expansion joint assembly according to claim 1 wherein there are four corrugated walls disposed in substantially 90° relationship one with respect to the next adjacent one, and four corrugated corner walls interconnecting the end portions of said four corrugated walls.

6. An expansion joint assembly according to claim 5 wherein each of said corner members is fabricated from a pair of oppositely disposed dished doughnut shaped plates welded together around their peripheries and cut into substantially 90° segments.

7. An expansion joint assembly according to claim 1 wherein the U-shaped members and the U-shaped corner members are fabricated from material substantially more resilient than the C-shaped channels and the rounded corner flats.

References Cited

UNITED STATES PATENTS

| | | | |
|---|---|---|---|
| 2,313,490 | 3/1943 | Lauffer | 285—301 |
| 2,797,112 | 6/1957 | Ziebold | 285—226 |
| 3,106,414 | 10/1963 | Peters | 285—226 |
| 3,254,508 | 6/1966 | Garrett | 285—226 |

EDWARD C. ALLEN, Primary Examiner